United States Patent
Kurtz (10) Patent No.: US 12,394,213 B2
(45) Date of Patent: Aug. 19, 2025

(54) POLYGON SEQUENCE MATCHING FOR LABEL ASSOCIATION IN AUTONOMOUS VEHICLE LOGS

(71) Applicant: FORD GLOBAL TECHNOLOGIES, LLC, Dearborn, MI (US)

(72) Inventor: Zachary Kurtz, Pittsburgh, PA (US)

(73) Assignee: Ford Global Technologies, LLC, Dearborn, MI (US)

(*) Notice: Subject to any disclaimer, the term of this patent is extended or adjusted under 35 U.S.C. 154(b) by 259 days.

(21) Appl. No.: 18/094,133

(22) Filed: Jan. 6, 2023

(65) Prior Publication Data

US 2024/0233459 A1    Jul. 11, 2024

(51) Int. Cl.
*G06V 20/58* (2022.01)
*G06F 16/783* (2019.01)
(Continued)

(52) U.S. Cl.
CPC ......... *G06V 20/58* (2022.01); *G06F 16/7837* (2019.01); *G06N 20/00* (2019.01);
(Continued)

(58) Field of Classification Search
CPC ........ G06V 20/58; G06V 20/46; G06V 20/48; G06V 20/56; G06F 16/7837; G06N 20/00; G06T 7/292; G06T 2207/30252
See application file for complete search history.

(56) References Cited

U.S. PATENT DOCUMENTS

| | | |
|---|---|---|
| 10,339,669 B2 | 7/2019 | Kwant et al. |
| 11,099,569 B2 | 8/2021 | Haynes |
| (Continued) | | |

FOREIGN PATENT DOCUMENTS

| | | |
|---|---|---|
| CN | 109544575 | 11/2021 |
| CN | 11155185 | 3/2022 |

OTHER PUBLICATIONS

Boris Chen, et al, "Match Cutting: Finding Cuts with Smooth Visual Transitions", Oct. 11, 2022, Proceedings of the IEEE/CVF Winter Conference on Applications of Computer Vision, All pages (Year: 2022).*

(Continued)

*Primary Examiner* — Roberto Borja
(74) *Attorney, Agent, or Firm* — Frank A. MacKenzie; Brooks Kushman, P.C.

(57) ABSTRACT

Disclosed herein are system, method, and computer program product embodiments for polygon sequence matching for label association in autonomous vehicle logs. A logged polygon is identified in each logged frame of a logged track. For each logged frame in the logged track, a labeled frame is retrieved from a labeled track that has a timestamp within a predetermined time window of the timestamp of the logged polygon. A similarity score is generated by comparing the logged polygon and the labeled polygon in the labeled frame. The logged frame and the labeled frame are identified as a match-frame when the similarity score meets a first threshold. A candidate pair is generated for each match-frame comprising the logged track and the labeled track that includes the labeled frame identified in the match-frame. The candidate pair with a match quality score meeting a second threshold is displayed.

14 Claims, 7 Drawing Sheets

(51) Int. Cl.
  *G06N 20/00* (2019.01)
  *G06T 7/292* (2017.01)
  *G06V 20/40* (2022.01)
  *G06V 20/56* (2022.01)
  *G06N 3/08* (2023.01)
  *G06V 10/764* (2022.01)
  *G06V 10/82* (2022.01)
  *G07C 5/08* (2006.01)
  *H04N 23/61* (2023.01)

(52) U.S. Cl.
  CPC .............. *G06T 7/292* (2017.01); *G06V 20/46* (2022.01); *G06V 20/48* (2022.01); *G06V 20/56* (2022.01); *G06N 3/08* (2013.01); *G06T 2207/10016* (2013.01); *G06T 2207/30252* (2013.01); *G06V 10/764* (2022.01); *G06V 10/82* (2022.01); *G07C 5/08* (2013.01); *H04N 23/61* (2023.01)

(56) References Cited

U.S. PATENT DOCUMENTS

| | | |
|---|---|---|
| 11,216,689 B2 | 1/2022 | Bansal |
| 11,217,012 B2 | 1/2022 | Urtasum et al. |
| 11,238,369 B2 | 2/2022 | Demiralp et al. |
| 2009/0052784 A1* | 2/2009 | Covell .................. G06F 16/783 382/209 |
| 2021/0342609 A1 | 11/2021 | Smolyanskiy et al. |
| 2023/0097156 A1* | 3/2023 | Hirokawa .......... G06V 40/1335 382/125 |
| 2023/0143574 A1* | 5/2023 | Hillman Beauchesne .................. G06V 40/172 382/103 |
| 2023/0360379 A1* | 11/2023 | Zhou .................... G06V 20/582 |

OTHER PUBLICATIONS

Cavallo, M. et al. "Track Xplorer: A System for Visual Analysis of Sensor-based Motor Activity Predictions." *In Computer Graphics Forum* (vol. 37, No. 3, pp. 339-349). Jun. 2018. Retrieved from https://arxiv.org/pdf/1806.09256.pdf.

Jörgensen, E., et al., "Monocular 3d Object Detection and Box Fitting Trained End-to-End Using Intersection-over-Union Loss" arXiv preprint arXiv:1906.08070. Jun. 2019. Retrieved from https://arxiv.org/pdf/1906.08070.pdf.

* cited by examiner

| Logged Track ID 602 – Score Report | | |
|---|---|---|
| Candidate Pair ID 604 | Labeled Track ID 606 | Match Quality Score 608 |
| Candidate Pair ID 610 | Labeled Track A | 30 |

POLYGON SEQUENCE MATCHING FOR LABEL ASSOCIATION IN AUTONOMOUS VEHICLE LOGS

BACKGROUND

Autonomous vehicles detect, classify, and make decisions regarding how to handle objects and/or actors in its environment. To perform these functions, autonomous vehicles deploy machine learning models that are trained on a set of ground-truth data comprising labeled tracks. A labeled track contains a plurality of frames, wherein each frame includes one polygon that represents an actor or object. The polygon in the frame may be assigned any number of tags that describe the actor or object and its exhibited behavior. For example, a polygon may have multiple tags if the behavior exhibited by the object falls within more than one behavior category, or the polygon may not have any tags assigned to it if none of the behavior categories apply to the object. Conventionally, human labelers construct labeled tracks— visually and semi-manually—by drawing a polygon on each frame and assigning zero or more tags to each polygon. And, since machine learning models require large amounts of labeled data to perform well, manually labeling all tracks may not be feasible or practical.

SUMMARY

According to some aspects of this disclosure, a computer-implemented method for polygon sequence matching for label association in autonomous vehicle logs is described. The method includes retrieving, by a computing system comprising one or more processors, a logged track from one or more computing devices of an autonomous vehicle (AV) system and a plurality of labeled tracks from a database. A logged track comprises a sequence of logged frames, and each labeled track in the plurality of labeled tracks comprises a sequence of labeled frames. The method further includes identifying a logged polygon in each logged frame in the logged track. For each logged frame in the logged track, the method includes retrieving a labeled frame from a labeled track that has a labeled timestamp within a predetermined time window of a logged timestamp of the logged polygon identified in the respective logged frame. A similarity score is generated based on a comparison of the logged polygon identified in the respective logged frame and the labeled polygon in the labeled frame. The respective logged frame and labeled frame are identified as a match-frame based on a comparison of the similarity score to a first user-defined threshold. The method also includes generating a candidate pair for a match-frame. A candidate pair comprises the respective logged track and the labeled track that includes the labeled frame in the identified match-frame. Because multiple match-frames may be identified in the above frame-level comparison of a logged track and a labeled track, the method may generate one or more duplicate candidate pairs. A duplicate candidate pair is a candidate pair that includes the same combination of a logged track and a labeled track as a previously identified candidate pair. Accordingly, the method further includes removing duplicate candidate pairs and generating a match quality score for each remaining candidate pair. Thereafter, a candidate pair is displayed in an output interface based on a comparison of the match quality score to a second user-defined threshold.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for polygon sequence matching for label association in autonomous vehicle logs. Autonomous vehicles (AVs) detect, classify, and make decisions regarding how to handle objects and/or actors in its environment. To perform these functions, autonomous vehicles use one or more machine learning models that are trained using large amounts of ground-truth data comprising labeled tracks. However, the creation of labeled tracks necessarily requires human input. Human-labelers construct a labeled track—visually and semi-manually—by drawing a polygon on each frame that represents an object or actor and assigning applicable tag(s), if any, to each polygon identified in the frame.

One way to leverage the limited amount of labeled track data is to identify the most relevant label for a logged track by matching the logged track to labeled tracks. However, existing matching algorithms function only locally (i.e., at one frame at a time) and produce matches that are imprecise (e.g., results that are false negatives, false positives, or vary over time). Robust matching of a logged track and labeled tracks requires consideration of the entire time series associated with the tracks. For example, if a logged track matches with a labeled track for the vast majority of a time series, such evidence could be relied on to override any failures to match at individual time steps. However, current perception systems are unable to consider the sequence structure in a logged track to labeled track matching process.

Embodiments described herein provide a process and system for polygon sequence matching for label association in autonomous vehicle logs that addresses the above technological problem by considering the sequence structure in a logged track to labeled track matching process. The logged track to labeled track matching process is a two-step process that involves first performing frame-level matching between logged and labeled tracks, then performing sequence-level matching. During the frame-level matching process, a set of match-frames (i.e., matching frames from a logged track and labeled tracks) that satisfy minimum temporal and spatial nearness requirements are identified. For each identified match-frame, a candidate pair comprising the logged track and the labeled track associated with the identified match-frame is generated. During the sequence-level matching process, match quality scores are computed for each non-duplicate candidate pair. The candidate pairs that have match quality scores at or above a user-defined threshold are displayed in a table on an output interface.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" (or "AV") is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle.

Notably, the present solution is being described herein in the context of an autonomous vehicle. However, the present solution is not limited to autonomous vehicle applications. The present solution may be used in other applications such as robotic applications, radar system applications, metric applications, and/or system performance applications.

Figure 1:
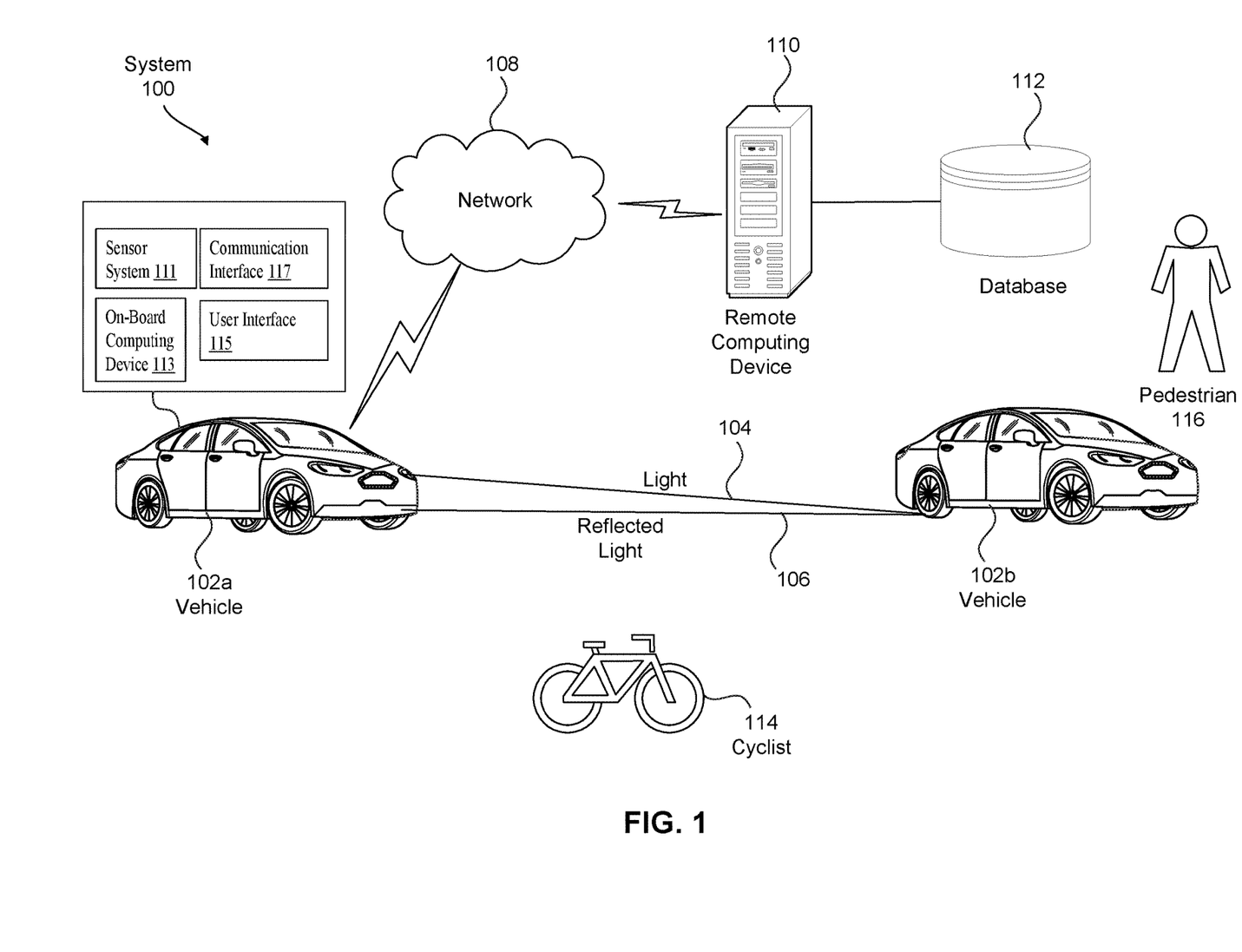
FIG. 1 illustrates an exemplary autonomous vehicle system, in accordance with aspects of the disclosure.

FIG. 1 illustrates an exemplary autonomous vehicle system 100, in accordance with aspects of the disclosure. System 100 comprises a vehicle 102a that is traveling along a road in a semi-autonomous or autonomous manner. Vehicle 102a is also referred to herein as AV 102a. AV 102a can include, but is not limited to, a land vehicle (as shown in FIG. 1), an aircraft, or a watercraft.

AV 102a is generally configured to detect objects 102b, 114, 116 in proximity thereto. The objects can include, but are not limited to, a vehicle 102b, cyclist 114 (such as a rider of a bicycle, electric scooter, motorcycle, or the like) and/or a pedestrian 116.

As illustrated in FIG. 1, the AV 102a may include a sensor system 111, an on-board computing device 113, a communications interface 117, and a user interface 115. Autonomous vehicle 101 may further include certain components (as illustrated, for example, in FIG. 2) included in vehicles, which may be controlled by the on-board computing device 113 using a variety of communication signals and/or commands, such as, for example, acceleration signals or commands, deceleration signals or commands, steering signals or commands, braking signals or commands, etc.

Figure 2:
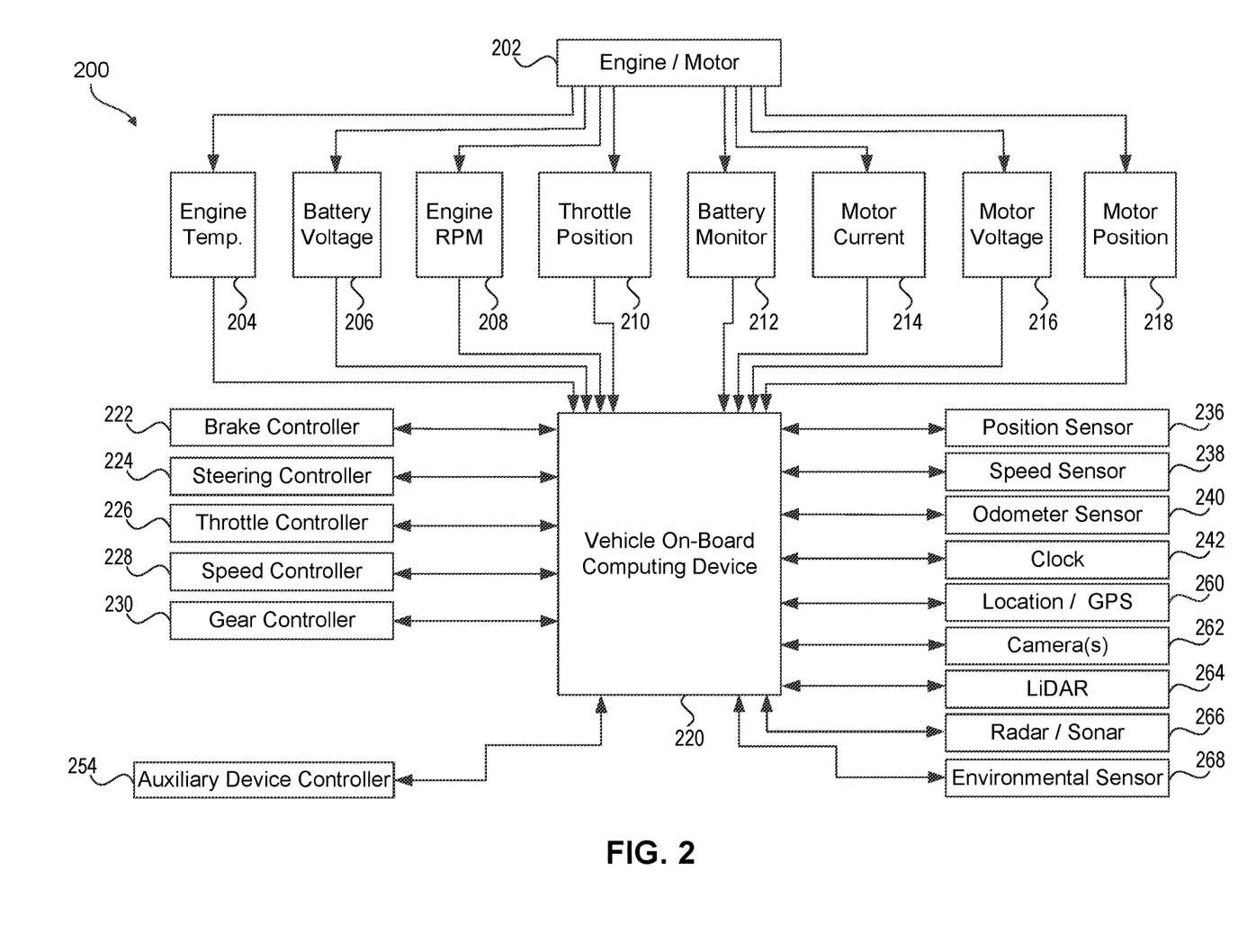
FIG. 2 illustrates an exemplary architecture for a vehicle, in accordance with aspects of the disclosure.

The sensor system 111 may include one or more sensors that are coupled to and/or are included within the AV 102a, as illustrated in FIG. 2. For example, such sensors may include, without limitation, a lidar system, a radio detection and ranging (RADAR) system, a laser detection and ranging (LADAR) system, a sound navigation and ranging (SONAR) system, one or more cameras (e.g., visible spectrum cameras, infrared cameras, etc.), temperature sensors, position sensors (e.g., global positioning system (GPS), etc.), location sensors, fuel sensors, motion sensors (e.g., inertial measurement units (IMU), etc.), humidity sensors, occupancy sensors, or the like. The sensor data can include information that describes the location of objects within the surrounding environment of the AV 102a, information about the environment itself, information about the motion of the AV 102a, information about a route of the vehicle, or the like. As AV 102a travels over a surface, at least some of the sensors may collect data pertaining to the surface.

As will be described in greater detail, AV 102a may be configured with a lidar system, e.g., lidar system 264 of FIG. 2. The lidar system may be configured to transmit a light pulse 104 to detect objects located within a distance or range of distances of AV 102a. Light pulse 104 may be incident on one or more objects (e.g., AV 102b) and be reflected back to the lidar system. Reflected light pulse 106 incident on the lidar system may be processed to determine a distance of that object to AV 102a. The reflected light pulse may be detected using, in some embodiments, a photodetector or array of photodetectors positioned and configured to receive the light reflected back into the lidar system. Lidar information, such as detected object data, is communicated from the lidar system to an on-board computing device, e.g., on-board computing device 220 of FIG. 2. The AV 102a may also communicate lidar data to a remote computing device 110 (e.g., cloud processing system) over communications network 108. Remote computing device 110 may be configured with one or more servers to process one or more processes of the technology described herein. Remote computing device 110 may also be configured to communicate data/instructions to/from AV 102a over network 108, to/from server(s) and/or database(s) 112.

It should be noted that the lidar systems for collecting data pertaining to the surface may be included in systems other than the AV 102a such as, without limitation, other vehicles (autonomous or driven), robots, satellites, etc.

Network 108 may include one or more wired or wireless networks. For example, the network 108 may include a cellular network (e.g., a long-term evolution (LTE) network, a code division multiple access (CDMA) network, a 3G network, a 4G network, a 5G network, another type of next generation network, etc.). The network may also include a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

AV 102a may retrieve, receive, display, and edit information generated from a local application or delivered via network 108 from database 112. Database 112 may be configured to store and supply raw data, indexed data, structured data, map data, program instructions or other configurations as is known.

The communications interface 117 may be configured to allow communication between AV 102a and external systems, such as, for example, external devices, sensors, other vehicles, servers, data stores, databases etc. The communications interface 117 may utilize any now or hereafter known protocols, protection schemes, encodings, formats, packaging, etc. such as, without limitation, Wi-Fi, an infrared link, Bluetooth, etc. The user interface system 115 may be part of peripheral devices implemented within the AV 102a including, for example, a keyboard, a touch screen display device, a microphone, and a speaker, etc.

FIG. 2 illustrates an exemplary system architecture 200 for a vehicle, in accordance with aspects of the disclosure. Vehicles 102a and/or 102b of FIG. 1 can have the same or similar system architecture as that shown in FIG. 2. Thus, the following discussion of system architecture 200 is sufficient for understanding vehicle(s) 102a, 102b of FIG. 1. However, other types of vehicles are considered within the scope of the technology described herein and may contain more or less elements as described in association with FIG. 2. As a non-limiting example, an airborne vehicle may exclude brake or gear controllers, but may include an altitude sensor. In another non-limiting example, a water-based vehicle may include a depth sensor. One skilled in the art will appreciate that other propulsion systems, sensors and controllers may be included based on a type of vehicle, as is known.

As shown in FIG. 2, system architecture 200 includes an engine or motor 202 and various sensors 204-218 for measuring various parameters of the vehicle. In gas-powered or hybrid vehicles having a fuel-powered engine, the sensors may include, for example, an engine temperature sensor 204, a battery voltage sensor 206, an engine Rotations Per Minute ("RPM") sensor 208, and a throttle position sensor 210. If the vehicle is an electric or hybrid vehicle, then the vehicle may have an electric motor, and accordingly includes sensors such as a battery monitoring system 212 (to measure current, voltage and/or temperature of the battery), motor current 214 and voltage 216 sensors, and motor position sensors 218 such as resolvers and encoders.

Operational parameter sensors that are common to both types of vehicles include, for example: a position sensor 236 such as an accelerometer, gyroscope and/or inertial measurement unit; a speed sensor 238; and an odometer sensor 240. The vehicle also may have a clock 242 that the system uses to determine vehicle time during operation. The clock 242 may be encoded into the vehicle on-board computing device, it may be a separate device, or multiple clocks may be available.

The vehicle also includes various sensors that operate to gather information about the environment in which the vehicle is traveling. These sensors may include, for example: a location sensor 260 (e.g., a Global Positioning System ("GPS") device); object detection sensors such as one or more cameras 262; a lidar system 264; and/or a radar and/or a sonar system 266. The sensors also may include environmental sensors 268 such as a precipitation sensor and/or ambient temperature sensor. The object detection sensors may enable the vehicle to detect objects that are within a given distance range of the vehicle 200 in any direction, while the environmental sensors collect data about environmental conditions within the vehicle's area of travel.

During operations, information is communicated from the sensors to a vehicle on-board computing device 220. The on-board computing device 220 may be implemented using the computer system of FIG. 7. The vehicle on-board computing device 220 analyzes the data captured by the sensors and optionally controls operations of the vehicle based on results of the analysis. For example, the vehicle on-board computing device 220 may control: braking via a brake controller 222; direction via a steering controller 224; speed and acceleration via a throttle controller 226 (in a gas-powered vehicle) or a motor speed controller 228 (such as a current level controller in an electric vehicle); a differential gear controller 230 (in vehicles with transmissions); and/or other controllers. Auxiliary device controller 254 may be configured to control one or more auxiliary devices, such as testing systems, auxiliary sensors, mobile devices transported by the vehicle, etc.

Geographic location information may be communicated from the location sensor 260 to the on-board computing device 220, which may then access a map of the environment that corresponds to the location information to determine known fixed features of the environment such as streets, buildings, stop signs and/or stop/go signals. Captured images from the cameras 262 and/or object detection information captured from sensors such as lidar system 264 is communicated from those sensors) to the on-board computing device 220. The object detection information and/or captured images are processed by the on-board computing device 220 to detect objects in proximity to the vehicle 200. Any known or to be known technique for making an object detection based on sensor data and/or captured images can be used in the embodiments disclosed in this document.

Lidar information is communicated from lidar system 264 to the on-board computing device 220. Additionally, captured images are communicated from the camera(s) 262 to the vehicle on-board computing device 220. The lidar information and/or captured images are processed by the vehicle on-board computing device 220 to detect objects in proximity to the vehicle 200. The manner in which the object detections are made by the vehicle on-board computing device 220 includes such capabilities detailed in this disclosure.

The on-board computing device 220 may include and/or may be in communication with a routing controller 231 that generates a navigation route from a start position to a destination position for an autonomous vehicle. The routing controller 231 may access a map data store to identify possible routes and road segments that a vehicle can travel on to get from the start position to the destination position. The routing controller 231 may score the possible routes and identify a preferred route to reach the destination. For example, the routing controller 231 may generate a navigation route that minimizes Euclidean distance traveled or other cost function during the route, and may further access the traffic information and/or estimates that can affect an amount of time it will take to travel on a particular route. Depending on implementation, the routing controller 231 may generate one or more routes using various routing methods, such as Dijkstra's algorithm, Bellman-Ford algorithm, or other algorithms. The routing controller 231 may also use the traffic information to generate a navigation route that reflects expected conditions of the route (e.g., current day of the week or current time of day, etc.), such that a route generated for travel during rush-hour may differ from a route generated for travel late at night. The routing controller 231 may also generate more than one navigation route to a destination and send more than one of these navigation routes to a user for selection by the user from among various possible routes.

In various embodiments, the on-board computing device 220 may determine perception information of the surrounding environment of the AV 102a. Based on the sensor data provided by one or more sensors and location information that is obtained, the on-board computing device 220 may determine perception information of the surrounding environment of the AV 102a. The perception information may represent what an ordinary driver would perceive in the surrounding environment of a vehicle. The perception data may include information relating to one or more objects in the environment of the AV 102a. For example, the on-board computing device 220 may process sensor data (e.g., lidar or RADAR data, camera images, etc.) in order to identify objects and/or features in the environment of AV 102a. The objects may include traffic signals, road way boundaries, other vehicles, pedestrians, and/or obstacles, etc. The on-board computing device 220 may use any now or hereafter known object recognition algorithms, video tracking algorithms, and computer vision algorithms (e.g., track objects frame-to-frame iteratively over a number of time periods) to determine the perception.

In some embodiments, the on-board computing device 220 may also determine, for one or more identified objects in the environment, the current state of the object. The state information may include, without limitation, for each object: current location; current speed and/or acceleration, current heading; current pose; current shape, size, or footprint; type (e.g., vehicle vs. pedestrian vs. bicycle vs. static object or obstacle); and/or other state information.

The on-board computing device 220 may perform one or more prediction and/or forecasting operations. For example, the on-board computing device 220 may predict future locations, trajectories, and/or actions of one or more objects. For example, the on-board computing device 220 may predict the future locations, trajectories, and/or actions of the objects based at least in part on perception information (e.g., the state data for each object comprising an estimated shape and pose determined as discussed below), location information, sensor data, and/or any other data that describes the past and/or current state of the objects, the AV 102a, the surrounding environment, and/or their relationship(s). For example, if an object is a vehicle and the current driving environment includes an intersection, the on-board computing device 220 may predict whether the object will likely move straight forward or make a turn. If the perception data indicates that the intersection has no traffic light, the on-board computing device 220 may also predict whether the vehicle may have to fully stop prior to enter the intersection.

In various embodiments, the on-board computing device 220 may determine a motion plan for the autonomous vehicle. For example, the on-board computing device 220 may determine a motion plan for the autonomous vehicle based on the perception data and/or the prediction data. Specifically, given predictions about the future locations of proximate objects and other perception data, the on-board computing device 220 can determine a motion plan for the AV 102a that best navigates the autonomous vehicle relative to the objects at their future locations.

In some embodiments, the on-board computing device 220 may receive predictions and make a decision regarding how to handle objects and/or actors in the environment of the AV 102a. For example, for a particular actor (e.g., a vehicle with a given speed, direction, turning angle, etc.), the on-board computing device 220 decides whether to overtake, yield, stop, and/or pass based on, for example, traffic conditions, map data, state of the autonomous vehicle, etc. Furthermore, the on-board computing device 220 also plans a path for the AV 102a to travel on a given route, as well as driving parameters (e.g., distance, speed, and/or turning angle). That is, for a given object, the on-board computing device 220 decides what to do with the object and determines how to do it. For example, for a given object, the on-board computing device 220 may decide to pass the object and may determine whether to pass on the left side or right side of the object (including motion parameters such as speed). The on-board computing device 220 may also assess the risk of a collision between a detected object and the AV 102a. If the risk exceeds an acceptable threshold, it may determine whether the collision can be avoided if the autonomous vehicle follows a defined vehicle trajectory and/or implements one or more dynamically generated emergency maneuvers is performed in a pre-defined time period (e.g., N milliseconds). If the collision can be avoided, then the on-board computing device 220 may execute one or more control instructions to perform a cautious maneuver (e.g., mildly slow down, accelerate, change lane, or swerve). In contrast, if the collision cannot be avoided, then the on-board computing device 220 may execute one or more control instructions for execution of an emergency maneuver (e.g., brake and/or change direction of travel).

As discussed above, planning and control data regarding the movement of the AV is generated for execution. The on-board computing device 220 may, for example, control braking via a brake controller; direction via a steering controller; speed and acceleration via a throttle controller (in a gas-powered vehicle) or a motor speed controller (such as a current level controller in an electric vehicle); a differential gear controller (in vehicles with transmissions); and/or other controllers.

During operation, an AV may create vehicle logs, such as log slices, that describe all data (e.g., images, video recordings, etc.) collected by the on-board computing device 113. When the AV returns to base, the AV may upload the vehicle logs to a computing device such as the remote computing device 110 in FIG. 1. Thereafter, the computing device may mine one or more individual logged tracks from the vehicle log and assign an identifier to each logged track. A logged track is a track that represents a discrete time window in the vehicle log. It comprises a series of camera, video, or lidar frames belonging to one object or actor. Each object or actor that appears in a frame of a logged track may be represented as a polygon. A polygon describes the physical extent of a tracked object or actor in the frame and comprises a sequence of two-dimensional points where the first point is the same as the last point. A logged frame is a frame in the logged track, and a logged timestamp is a timestamp associated with the logged frame. A logged polygon is the polygon in the logged frame of the logged track. The logged track may additionally include various labels that have been assigned by the AV during operation. However, AV-generated labels are not validated labels.

Figure 3:
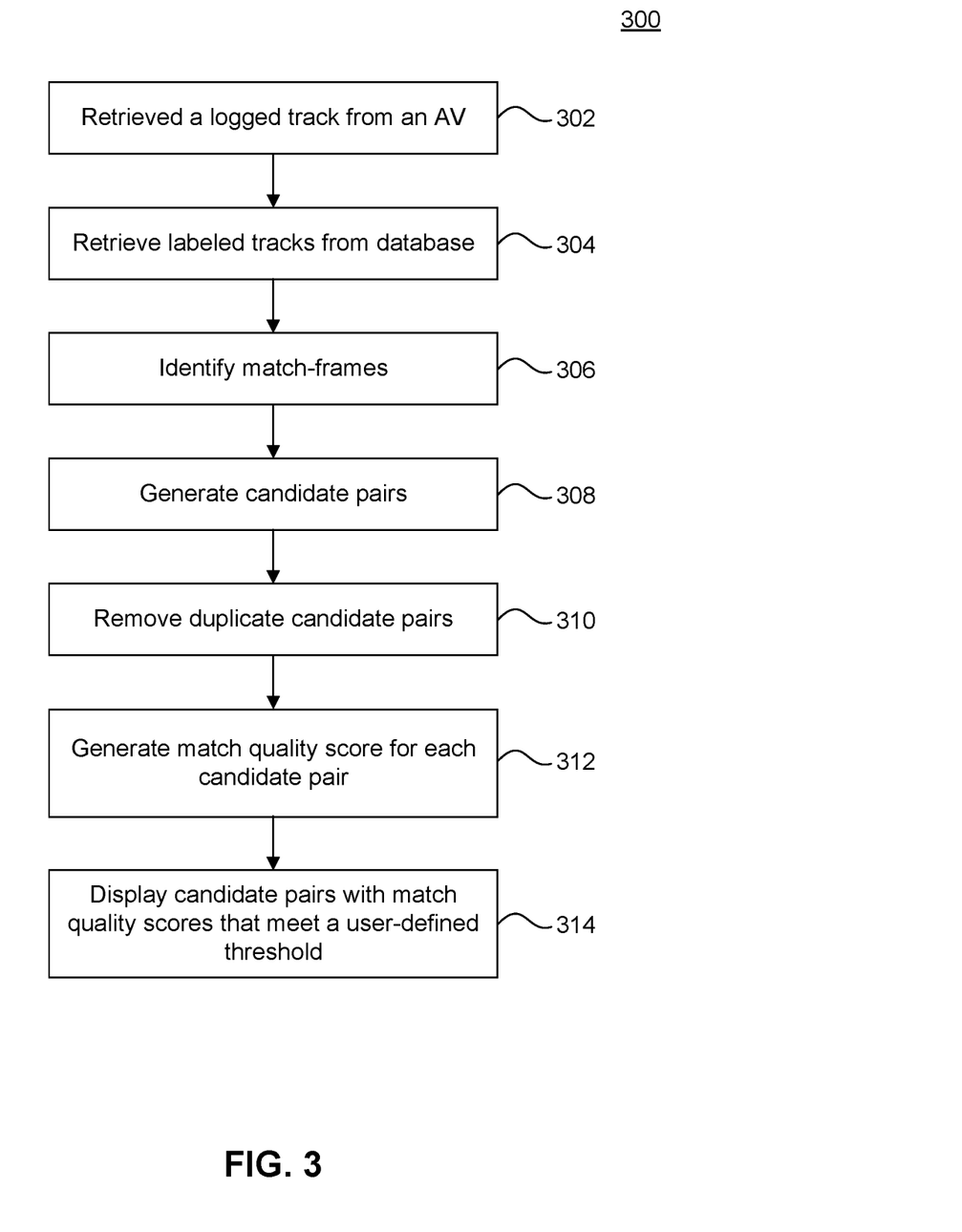
FIG. 3 illustrates a flow diagram of an example method for identifying the most relevant label(s) for a logged track, in accordance with aspects of the disclosure.

FIG. 3 illustrates a flow diagram of an example method 300 for identifying the most relevant label(s) for a logged track, in accordance with aspects of the disclosure. In this context, a label is a tag that describes the object or actor in the logged track. According to one or more example embodiments of this disclosure, the example method 300 may be implemented by a computing device such as the remote computing device 110 in FIG. 1.

The method 300 may begin with block 302, which may include retrieving, by a computing system, one or more logged tracks from an AV. Block 304 of the method 300 may include retrieving labeled tracks from a database. A labeled track is a track that may be created by a human labeler, according to some embodiments. In another embodiment, a labeled track may be computer-generated. Similar to a logged track, a labeled track comprises a series of camera, video, or lidar frames belonging to one object or actor. Labeled tracks are created by annotating each frame of previously unlabeled tracks. Annotating a frame may include generating a polygon in the frame that represents an object or actor and assigning a tag to the polygon that best describes the object or actor. A labeled frame is a frame in a labeled track, and a labeled timestamp is a timestamp associated with a labeled frame. A labeled polygon is a polygon in a labeled frame of a labeled track.

Block 306 of the method 300 may include identifying a set of match-frames based on a frame-level comparison of a logged track and each labeled track. A match-frame is a tuple comprising a matching logged frame and labeled frame. A frame-level comparison of a logged track and a labeled track may include comparing a logged polygon in a logged frame of the logged track to a labeled polygon in a labeled frame of the labeled track and determining a similarity score for the two polygons based on the comparison. The logged frame and the labeled frame are deemed to be a match-frame when the similarity score meets a first user-defined threshold. The first user-defined threshold is a hyper-parameter that establishes a minimum similarity score and filters out logged frame-and-labeled frame pairs that have similarity scores below the minimum similarity score. As will be described in further detail at FIG. 4, a frame-level comparison of a logged track and a labeled track is an iterative process that compares a logged polygon identified in each logged frame to a labeled polygon in each labeled frame that has a labeled timestamp within a specific time window of the identified logged polygon. Thus, in the method shown, it is contemplated that multiple match-frames may be identified during a frame-level comparison of a logged track and a labeled track.

Block 308 of the method 300 may include generating a candidate pair for each match-frame identified at block 306. A candidate pair comprises a logged track and a labeled track that includes the labeled frame in the identified match-frame. Because multiple match-frames may be identified during the frame-level comparison of a logged track and a labeled track, it is contemplated that block 308 may also generate one or more duplicate candidate pairs. Block 310 of the method 300 may include removing the one or more duplicate candidate pairs from the set of candidate pairs generated at block 308. A duplicate candidate pair is a candidate pair that includes the same combination of a logged track and a labeled track as a previously identified candidate pair. Removing one or more duplicate candidate pairs conserves computational resources by preventing subsequent redundant calculations based on the duplicate candidate pairs. This step may include deleting the one or more duplicate candidate pairs from the set of candidate pairs generated at block 308.

Block 312 of the method 300 may include generating a match quality score for each of the remaining non-duplicate candidate pairs. A match quality score is a metric that indicates the overall similarity between a logged track and a labeled track in the candidate pair. Generating a match quality score may include compiling all the match-frames for the candidate pair into a sequence and computing the sum of the similarity scores for the match-frames in the sequence. Furthermore, the method 300 may include assigning an identifier to each non-duplicate candidate pair and storing the candidate pairs with their assigned identifiers and match quality scores in the database. The method for generating a match quality score for a candidate pair is further described at FIG. 5.

Figure 6:
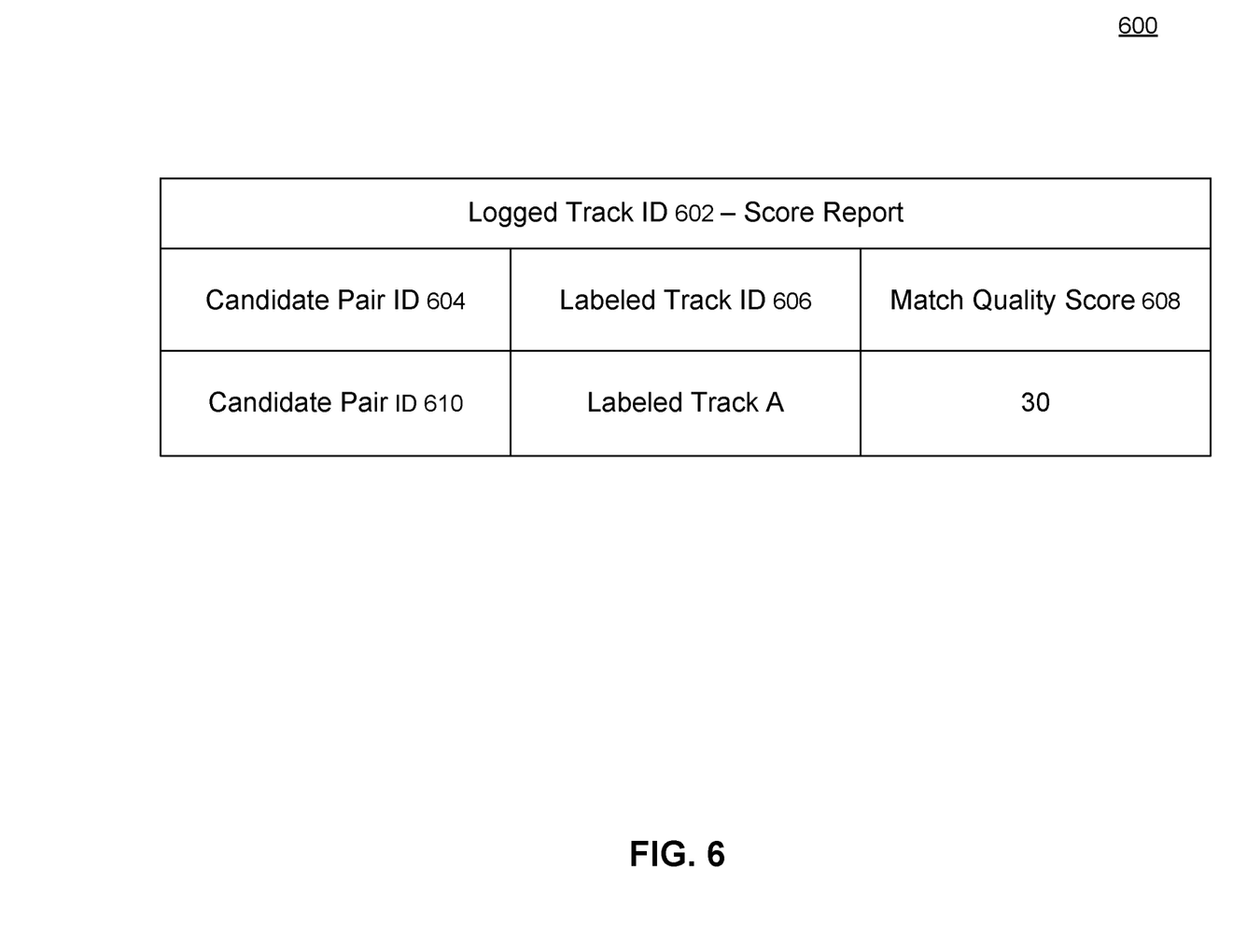
FIG. 6 illustrates an example output interface for displaying candidate pairs for a logged track with match quality scores that meet a user-defined threshold, in accordance with aspects of the disclosure.

Block 314 of the method 300 may include displaying candidate pairs with match quality scores that meet a second user-defined threshold in an output interface. The second user-defined threshold is a non-zero hyper-parameter that establishes a minimum match quality score and filters out candidate pairs with match quality scores that fall below the set minimum match quality score. FIG. 6 is an example output interface that displays the one or more candidate pairs that meet the second user-defined threshold.

Figure 4:
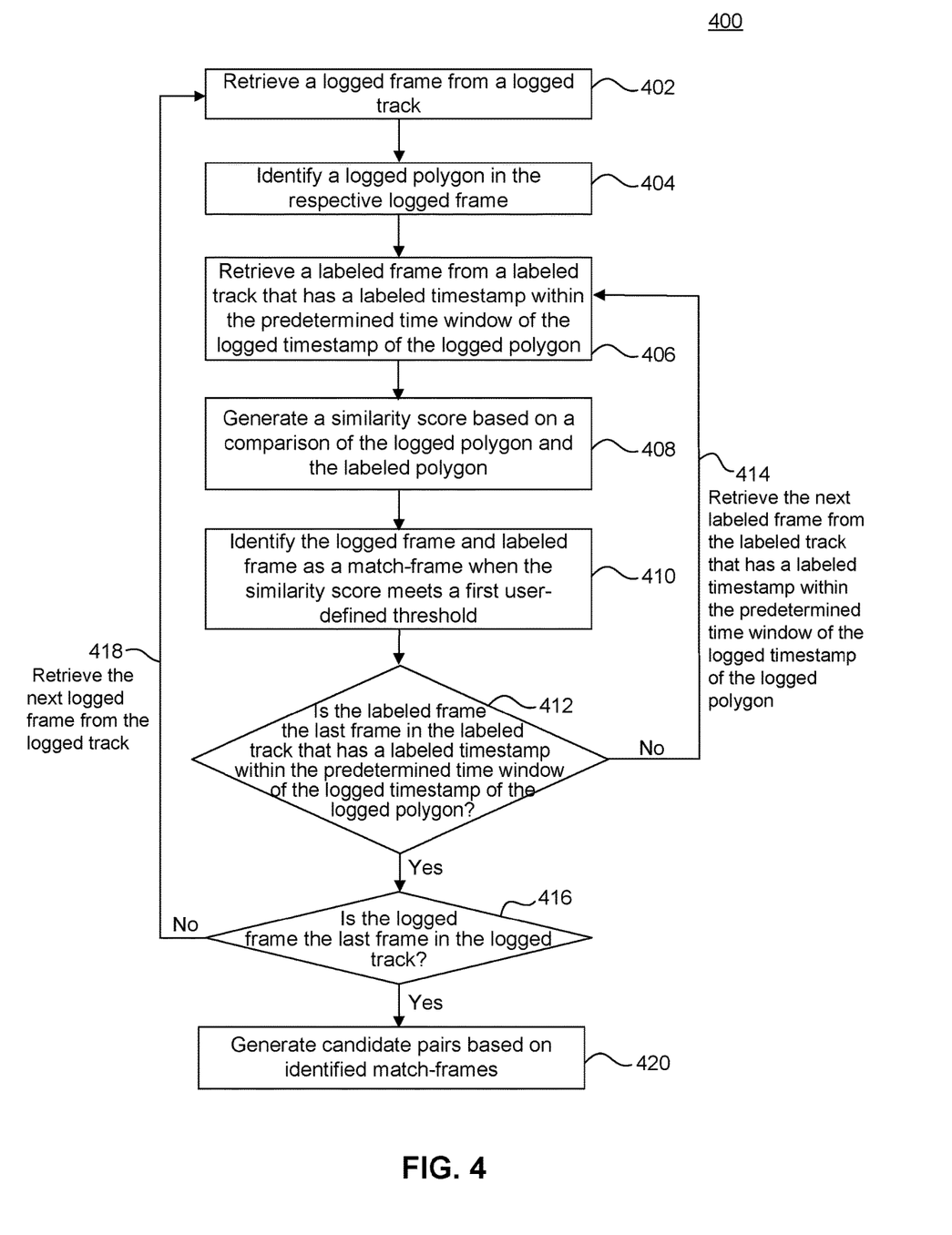
FIG. 4 illustrates a flow diagram of an example method for identifying match-frames in a logged track and a labeled track, in accordance with aspects of the disclosure.
Figure 5:
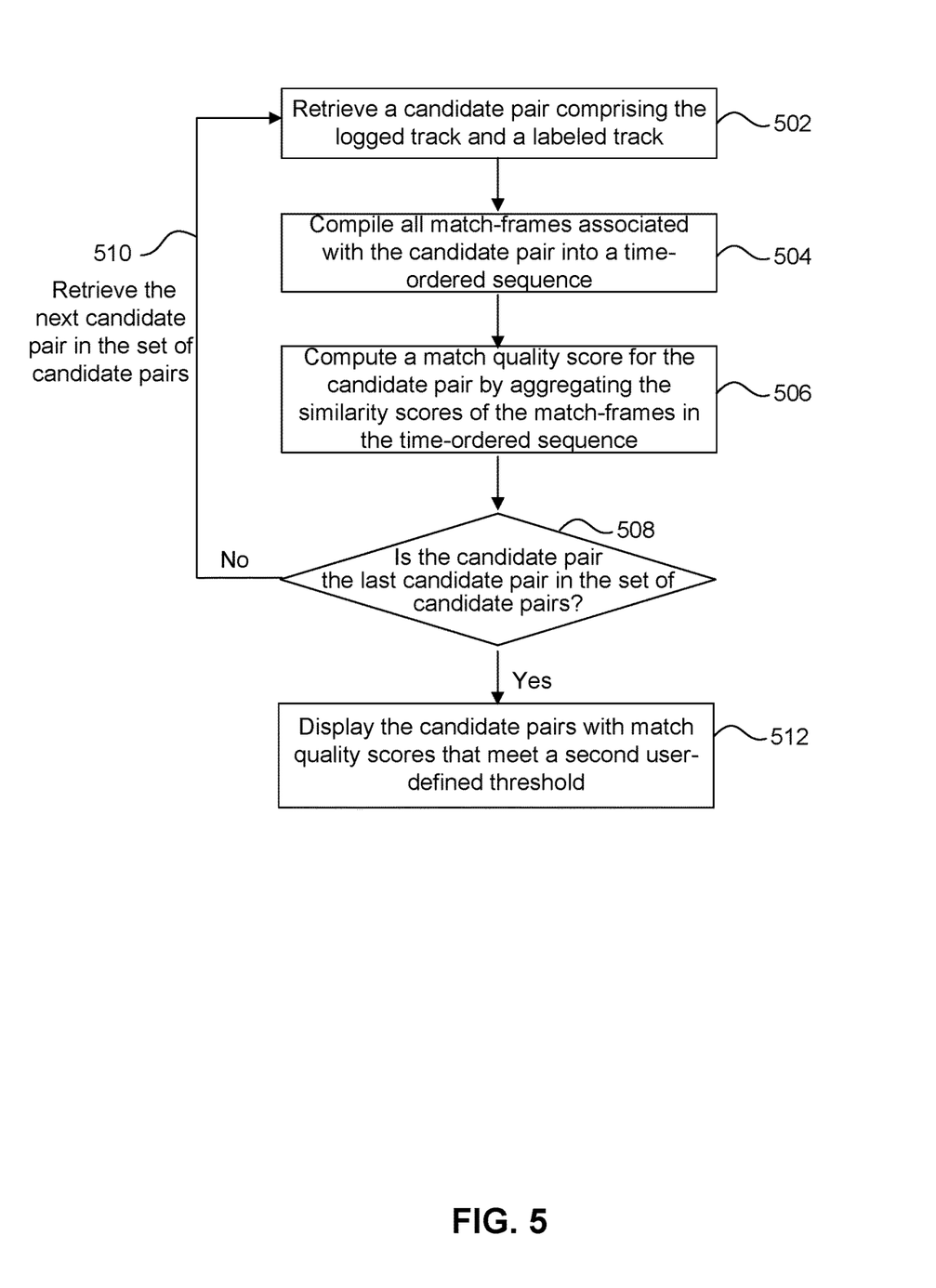
FIG. 5 illustrates a flow diagram of an example method for generating match quality scores for candidate pairs, in accordance with aspects of the disclosure.

FIGS. 4 and 5 further display key aspects of the method to identify the most relevant label(s) for a logged track. To better illustrate the inventive concept disclosed herein, an example scenario is provided. In this scenario, an AV creates a vehicle log that includes various video recordings of objects and actors encountered during its trip. After returning to the base station, the AV uploads the vehicle log to the computing device. Thereafter, the computing device mines the vehicle log into logged tracks and selects a logged track comprising 100 logged frames for label association. The logged track displays two people riding their bikes in front of the AV. The computing device further obtains a labeled dataset comprising five labeled tracks (e.g., A, B, C, D, and E) from a database, wherein each labeled track has 100 labeled frames. Although the number of labeled tracks used in this scenario is small, it is contemplated that a labeled dataset may contain many labeled tracks.

FIG. 4 illustrates a flow diagram of an example method 400 for identifying match-frames in a logged track and a labeled track, in accordance with aspects of the disclosure. As previously described at block 306 of the method 300, match-frames are identified based on a frame-level comparison of a logged track and a labeled track. The method 400 may begin at block 402, which may include retrieving a logged frame from a logged track. Retrieving a logged frame from the logged track may simply entail selecting the logged frame in the order that it appears in the logged track. For instance, in the above example scenario, the computing device initiates a frame-level comparison of the logged track and labeled track A by selecting the first logged frame in the logged track.

Block 404 of the method 400 may include identifying a logged polygon in the respective logged frame. As explained previously, a logged polygon in the respective logged frame describes the physical extent of an object or an actor in the respective logged frame. The computing system, such as the remote computing device 110 in FIG. 1, may use any currently used object detection method or algorithm (e.g., instance segmentation, semantic segmentation, etc.) to identify a logged polygon in a logged frame.

Block 406 of the method 400 may include retrieving a labeled frame from the labeled track that has a labeled timestamp within a predetermined time window of the logged timestamp for the logged polygon identified at block 404. The predetermined time window is a hyper-parameter that may be set to any time interval desired by the user. In the above example scenario, the predetermined time window may be a centered window and set at 0.1 seconds (or 0.05 seconds before and after the logged timestamp for the logged polygon). In other embodiments, the predetermined time window may only be a forward-looking time window (e.g., 0.1 seconds after the logged timestamp for the logged polygon). As previously described, the logged polygon identified at block 404 has a logged timestamp of 0.03 seconds. Accordingly, the computing device will retrieve a labeled frame that has a labeled timestamp within 0.03 and 0.08 seconds. In this example scenario, the first labeled frame of labeled track A has a labeled timestamp of 0.03 seconds. Thus, the computing device initially retrieves the first labeled of labeled track A because it has a labeled timestamp that falls within 0.03 and 0.08 seconds.

Block 408 of the method 400 may include generating a similarity score for the logged polygon identified in the logged frame at block 404 and the labeled polygon in the labeled frame retrieved at block 406. The similarity score is a metric that indicates how well a logged polygon in a logged frame matches or overlaps with a labeled polygon in a labeled frame. For example, a high degree of overlap between a logged polygon in a logged frame and a labeled polygon in a labeled frame suggests that the two polygons are similar while a low degree of overlap between the two polygons suggests that the two polygons are not similar. Generating a similarity score may include computing an intersection over union (IOU) value for the logged polygon identified in the logged frame at block 404 and the labeled polygon in the labeled frame retrieved at block 406. The IOU value may be calculated by dividing the area encompassed by the two polygons into the area of overlap between the two polygons. Although the example method 400 generates a similarity score by calculating an IOU value, other algorithms may be used to generate a similarity score without deviating from the scope of the present disclosure.

Block 410 of the method 400 may include identifying the logged frame and the labeled frame as a match-frame when the similarity score generated at block 408 meets a first user-defined threshold. The first user-defined threshold is a hyper-parameter that establishes a minimum similarity score. In the example method, it is applied as a filter to discard one or more logged frame-and-labeled frame pairs that have similarity scores below the minimum similarity score. For example, in the above example scenario, the first user-defined threshold for the similarity score may be 0.2. The computing device determines the IOU value for the logged polygon in the first logged frame and the labeled polygon in the first labeled frame in labeled track A may be 0.6. Accordingly, the computing device identifies the first logged frame and the first labeled frame in labeled track A to be match-frames because the IOU value of 0.6 surpasses the first user-defined threshold.

At decision diamond 412, the method 400 may include determining if the labeled track contains another labeled frame that has a labeled timestamp within a predetermined time window of the logged timestamp for the logged polygon identified at block 404. If not, the method 400 may include proceeding to decision diamond 416. If yes, the method 400 may include retrieving the next labeled frame that has a labeled timestamp within the predetermined time window of the logged polygon and repeating the steps outlined at blocks 408, 410, and decision diamond 412. The method 400 may include repeating loop 414 until it is determined that the labeled track does not contain any more labeled frames that have a labeled timestamp within the predetermined time window of the logged timestamp for the logged polygon identified at block 404.

For example, in the above example scenario, the computing device determines whether labeled track A contains another labeled frame that has a labeled timestamp within the predetermined time window of logged timestamp for the logged polygon. As described previously, the computing device will retrieve one or more labeled frames that have a labeled timestamp within 0.03 and 0.08 seconds. In this scenario, the second labeled frame has a labeled timestamp of 0.06 seconds and the third labeled frame has a labeled timestamp of 0.09 seconds. The second labeled frame has a labeled timestamp that falls within the predetermined time window of the logged timestamp for the logged polygon. Accordingly, the computing device retrieves the second labeled frame and calculates the IOU value for the logged polygon in the first logged frame and the labeled polygon in the second labeled frame. On the next iteration of decision diamond 412, the computing device determines that the third labeled frame does not have a labeled timestamp that falls within the predetermined time window of the logged timestamp for the logged polygon and thus proceeds to decision diamond 416.

At decision diamond 416, the method 400 may include determining whether the respective logged frame retrieved at block 402 is the last logged frame in the logged track. If not, the method 400 may include retrieving the next logged frame in the logged track and repeating the steps outlined at blocks 404, 406, 408, 410 and decision diamonds 412 and 416. The method 400 may include repeating loop 418 until every logged frame in the logged track has been retrieved and examined. If the respective logged frame is the last logged frame in the logged track, the method 400 may include proceeding to block 420.

At block 420, the method 400 may include generating candidate pairs based on the match-frames identified at block 410. In the above example scenario, the computing device compares the logged track to each of labeled tracks A, B, C, D, and E. Based on the frame-level comparisons, the computing device identifies a plurality of match-frames between the logged track and each of labeled tracks A, D, and E. The computing device further removes the duplicate candidate pairs from the set of candidate pairs. The remaining non-duplicate candidate pairs include a candidate pair comprising the logged track and labeled track A, a candidate pair comprising the logged track and labeled track D, and a candidate pair comprising the logged track and labeled track E.

FIG. 5 illustrates a flow diagram of an example method 500 for generating a match quality score for a candidate pair, in accordance with aspects of the disclosure. A match quality score is a metric that indicates the overall similarity between a logged track and a labeled track in the candidate pair. In the example method shown, generating a match quality score may include computing the sum of the IOU values of the match-frames for the candidate pair. Consideration of the total IOU value across the match-frames associated with the candidate pair reduces the impact of noise across individual frames.

The method 500 may begin at block 502, which may include identifying a candidate pair in the set of candidate pairs. Block 504 of the method 500 may include compiling the match-frames identified for the candidate pair in a time ordered sequence. At block 506, the method 500 may include generating a match quality score for the candidate pair by computing the sum or total of the IOU values across the match-frames in the sequence of match-frames associated with the candidate pair. Alternatively, or in addition to the match quality scores, the method 500 may also include generating other quality metrics for the candidate pairs. The method 500 may include generating a match quality percentage for the logged track by deriving the ratio of the match quality score for the respective candidate pair to the sum of match quality scores for all candidate pairs that include the logged track. The method 500 may include generating a match quality percentage for a labeled track in a particular candidate pair by deriving the ratio of the match quality score for the respective candidate pair to the sum of match quality scores for the other candidate pairs that include the labeled track. Computing a match quality percentage for the logged track and/or a match quality percentage for a labeled track in a particular candidate pair may offer additional insights. For example, a low match quality percentage for a logged track may suggest there are other labeled tracks that cumulatively have a much stronger match against the logged track. Additionally, a low match quality percentage for a labeled track in a candidate pair may indicate that one or more other logged tracks (in aggregate) matched to the same labeled track much more strongly than the logged track in the respective candidate pair.

At decision diamond 508, the method 500 may include determining whether the candidate pair retrieved at 502 is the last candidate pair in the set of candidate pairs to be assigned a match quality score. If it is, the method 500 may include proceeding to block 512. If the respective candidate pair is not the last candidate pair, the method 500 may include retrieving the next candidate pair in the set of candidate pairs and repeating the steps outlined in blocks 504, 506, and decision diamond 508. Furthermore, the method 500 may include repeating loop 510 until a match quality score has been generated for every candidate pair in the set of candidate pairs.

In the above example scenario, the computing device generates a match quality score for candidate pairs A, D, and E. For each candidate pair, the computing device compiles the match-frames identified for the candidate pair into a time-ordered sequence. In this scenario, the computing device compiles a sequence of 40 match-frames for the candidate pair comprising the logged track and labeled track A, a sequence of 15 match-frames for the candidate pair comprising the logged track and the labeled track D, and a sequence of 20 match-frames for the candidate pair comprising the logged track and labeled track E. The computing device generates a match quality score for the candidate pair by computing the sum of the IOU values of the match-frames in the sequence for that candidate pair. For example, in this scenario, the candidate pair comprising the logged track and labeled track A may have a match quality score of 30, the candidate pair comprising the logged track and labeled track D may have a match quality score of 10.9, and the candidate pair comprising the logged track and labeled track E may have a match quality score of 14.5. The computing device additionally assigns an identifier to each candidate pair and stores the candidate pairs along with their identifiers and match quality scores in the database.

Block 512 of the method 500 may include displaying candidate pairs with match quality scores that meet a second user-defined threshold in an output interface. The second user-defined threshold is a hyper-parameter that establishes a minimum match quality score. In the example method shown, the second user-defined threshold is applied as a filter to remove candidate pairs that have match quality scores below the set minimum match quality score from further consideration. For instance, in the above example scenario, the second user-defined threshold for the match quality score may be set to 20. Accordingly, the output interface displays the candidate pair comprising the logged track and labeled track A as shown in FIG. 6.

Alternatively, or in addition to the second user-defined threshold, the method 500 may include filtering the candidate pairs by applying one or more thresholds to one or more other quality metrics (e.g., the match quality percentage for the logged track, the match quality percentage for the labeled track, etc.). Doing so may lead to identifying a labeled track that best matches a logged track by filtering out one or more candidate pairs with high match quality scores when there is another candidate pair with an even higher match quality score. When training a classifier using matching labeled track data, it is critical to have a single row of training data for each logged frame of the logged track. Any many-to-one or one-to-many relationship between labels and the logged frames in a logged track violates standard assumptions regarding the independence between training samples that support inference-based machine learning models.

FIG. 6 illustrates an example output interface for displaying candidate pairs for a logged track with match quality scores that meet a user-defined threshold, in accordance with aspects of the disclosure. The output interface may comprise a data table that displays a candidate pair, its identifier, and its match quality score. The score report may include property data for the candidate pair such as an identifier of the labeled track and/or a link to the match sequence. The score report may include property data for one or more match-frames such as an identifier for a logged frame, an identifier for a labeled frame, a logged timestamp for a logged frame, and a labeled timestamp for a labeled frame. Alternatively, or in addition to the match quality scores, the score report may include one or more other quality metrics for each candidate pair. For example, the score report may display a match quality percentage for the logged track or a match quality percentage for the labeled track in the candidate pair.

Although FIGS. 3, 4, and 5 depict steps that are performed in a particular order for purposes of illustration and discussion, the methods of the present disclosure are not limited to the particularly illustrated order or arrangement. The various steps of methods 300, 400, and 500 can be omitted, rearranged, combined, and/or adapted in various ways without deviating from the scope of the present disclosure.

Figure 7:
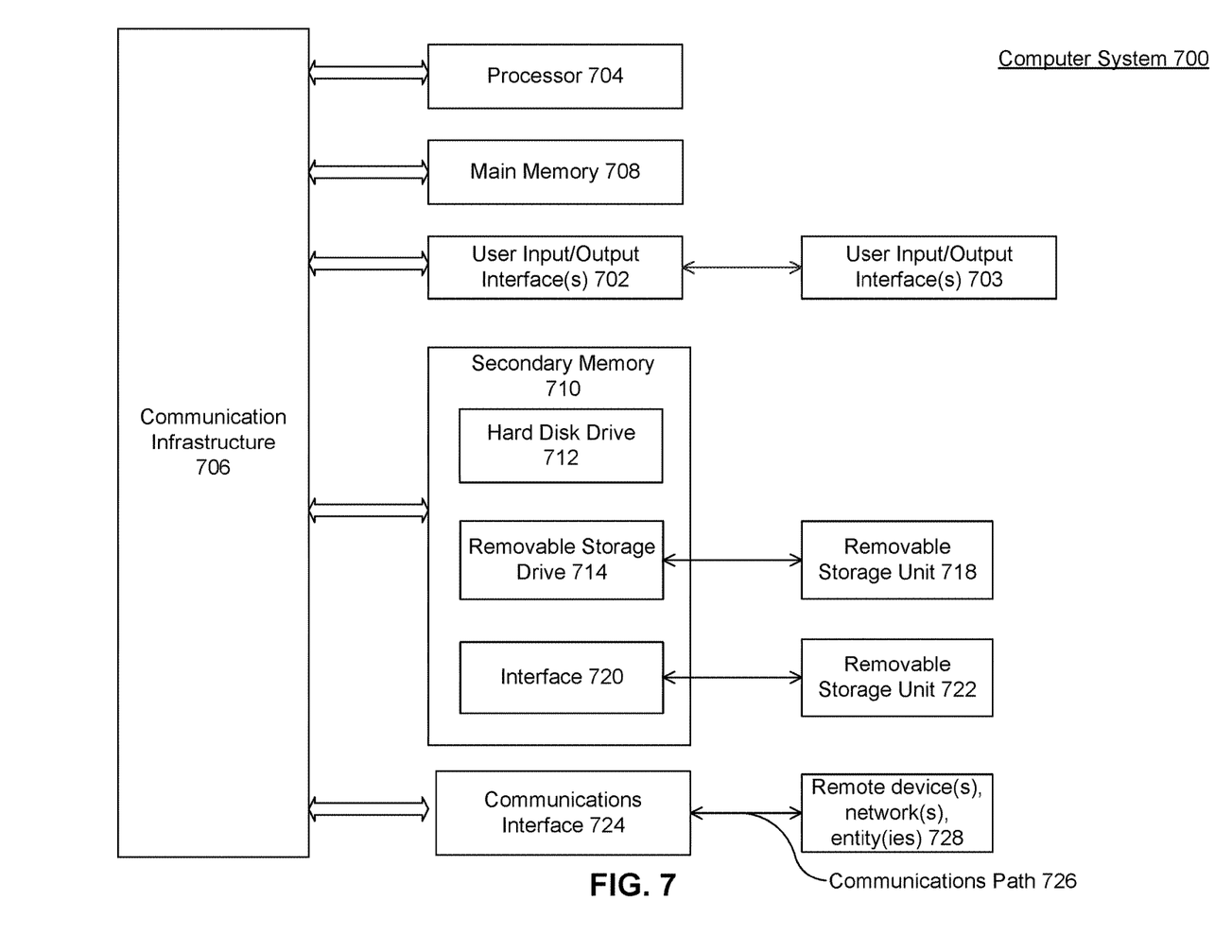
FIG. 7 illustrates an example computer system useful for implementing various embodiments.

Various embodiments can be implemented, for example, using one or more computer systems, such as computer system 700 shown in FIG. 7. Computer system 700 can be any computer capable of performing the functions described herein.

Computer system 700 includes one or more processors (also called central processing units, or CPUs), such as a processor 704. Processor 704 is connected to a communication infrastructure or bus 706.

One or more processors 704 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 also includes user input/output device(s) 703, such as monitors, keyboards, pointing devices, etc., that communicate with communication infrastructure 706 through user input/output interface(s) 702.

Computer system 700 also includes a main or primary memory 708, such as random access memory (RAM). Main memory 708 may include one or more levels of cache. Main memory 708 has stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 includes a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 reads from and/or writes to removable storage unit 718 in a well-known manner.

According to an exemplary embodiment, secondary memory 710 may include other means, instrumentalities or other approaches for allowing computer programs and/or other instructions and/or data to be accessed by computer system 700. Such means, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 enables computer system 700 to communicate and interact with any combination of remote devices, remote networks, remote entities, etc. (individually and collectively referenced by reference number 728). For example, communication interface 724 may allow computer system 700 to communicate with remote devices 728 over communications path 726, which may be wired and/or wireless, and which may include any combination of LANs, WANs, the Internet, etc. Control logic and/or data may be transmitted to and from computer system 700 via communication path 726.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for associating labels in autonomous vehicle logs, the computer-implemented method comprising:

retrieving a logged track from one or more computing devices of an autonomous vehicle (AV) system, wherein the logged track comprises a sequence of logged frames;

retrieving a plurality of labeled tracks from a database, wherein each labeled track comprises a sequence of labeled frames;

for each logged frame in the logged track:
identifying a logged polygon in the respective logged frame; and for each labeled track of the plurality of labeled tracks:
retrieving a labeled frame that has a labeled timestamp within a predetermined time window around a logged timestamp of the logged polygon identified in the respective logged frame;
generating a similarity score based on a comparison of the logged polygon identified in the respective logged frame and a labeled polygon in the labeled frame;
identifying the respective logged frame and the labeled frame as a match-frame based on a comparison of the similarity score to a first user-defined threshold;

generating a candidate pair for each identified match-frame comprising the logged track and the labeled track associated with the identified match-frame;

removing one or more duplicate candidate pairs;

generating a match quality score for each of the candidate pairs;

generating a match quality score percentage for each of the candidate pairs by:
identifying the labeled track in the respective candidate pair;
identifying other candidate pairs that include the identified labeled track;
computing a sum of the match quality scores for the other candidate pairs that include the identified labeled track; and
dividing the match quality score for the respective candidate pair by the sum of the match quality scores for the other candidate pairs that include the identified labeled track; and displaying the candidate pair based on a comparison of the match quality score to a second user-defined threshold.

2. The computer-implemented method of claim 1, wherein generating the match quality score for each of the candidate pairs comprises:
compiling the match-frames for the candidate pair in a time-ordered sequence;
and computing a sum of the similarity scores for the match-frames in the time-ordered sequence.

3. The computer-implemented method of claim 1, further comprising:
after removing the one or more duplicate candidate pairs, assigning an identifier to each of the candidate pairs; and
storing the candidate pairs, the assigned identifiers, and the match quality scores in a table in the database.

4. The computer-implemented method of claim 1, wherein the similarity score is an intersection over union value.

5. The computer-implemented method of claim 1, wherein the first user-defined threshold and the second user-defined threshold are non-zero values.

6. A system for associating labels in autonomous vehicle logs, the system comprising: one or more processors; and
a memory communicatively coupled to the one or more processors, wherein the memory stores instructions that, when executed by the one or more processors, cause the one or more processors to perform operations comprising:
retrieving a logged track from one or more computing devices of an autonomous vehicle (AV) system, wherein the logged track comprises a sequence of logged frames;
retrieving a plurality of labeled tracks from a database, wherein each labeled track comprises a sequence of labeled frames;
for each logged frame in the logged track:
identifying a logged polygon in the respective logged frame; and
for each labeled track of the plurality of labeled tracks:
retrieving a labeled frame that has a labeled timestamp within a predetermined time window around a logged timestamp of the logged polygon identified in the respective logged frame;
generating a similarity score based on a comparison of the logged polygon identified in the respective logged frame and a labeled polygon in the labeled frame;
identifying the respective logged frame and the labeled frame as a match-frame based on a comparison of the similarity score to a first user-defined threshold;
generating a candidate pair for each identified match-frame comprising the logged track and the labeled track associated with the identified match-frame;
removing one or more duplicate candidate pairs;
generating a match quality score for each of the candidate pairs;
generating a match quality score percentage for each of the candidate pairs by:
computing a sum of the match quality scores for all candidate pairs that include the logged track; and
dividing the match quality score for the respective candidate pair by the sum of the match quality scores for the candidate pairs that include the logged track; and displaying the candidate pair based on a comparison of the match quality score to a second user-defined threshold.

7. The system of claim 6, wherein generating a match quality score for each of the candidate pairs comprises:
compiling the match-frames for the candidate pair into a time-ordered sequence; and
computing a sum of the similarity scores for the match-frames in the time-ordered sequence.

8. The system of claim 6, wherein the operations further comprise:
after removing the one or more duplicate candidate pairs, assigning an identifier to each of the candidate pairs; and
storing the candidate pairs, the assigned identifiers, and the match quality scores in a table in the database.

9. The system of claim 6, wherein the similarity score is an intersection over union value.

10. The system of claim 6, wherein the first user-defined threshold and the second user-defined threshold are non-zero values.

11. A non-transitory computer readable medium having instructions stored thereon, that when executed by at least one computing device, cause the at least one computing device to perform operations comprising:
retrieving a logged track from one or more computing devices of an autonomous vehicle (AV) system, wherein the logged track comprises a sequence of logged frames;
retrieving a plurality of labeled tracks from a database, wherein each labeled track comprises a sequence of labeled frames;
for each logged frame in the logged track:
identifying a logged polygon in the respective logged frame; and for each labeled track of the plurality of labeled tracks:
retrieving a labeled frame that has a labeled timestamp within a predetermined time window around a logged timestamp of the logged polygon identified in the respective frame;
generating a similarity score based on a comparison of the logged polygon identified in the respective logged frame and a labeled polygon identified in the labeled frame; and
identifying the respective logged frame and the labeled frame as a match-frame based on a comparison of the similarity score to a first user-defined threshold;
generating a candidate pair for each identified match-frame comprising the logged track and the labeled track associated with the identified match-frame;
removing one or more duplicate candidate pairs;
generating a match quality score for each of the remaining candidate pairs;
generating a match quality score percentage for each of the candidate pairs by:
computing a sum of the match quality scores for all candidate pairs that include the logged track; and
dividing the match quality score for the respective candidate pair by the sum of the match quality scores for the candidate pairs that include the logged track; and
displaying the candidate pair based on a comparison of the match quality score to a second user-defined threshold.

12. The non-transitory computer readable medium of claim 11, wherein generating the match quality score for each of the candidate pairs comprises:

compiling the match-frames for the candidate pair into a time-ordered sequence; and computing a sum of the similarity scores for the match-frames in the time ordered sequence.

13. The non-transitory computer readable medium of claim 11, wherein the similarity score is an intersection over union value.

14. The non-transitory computer readable of claim 11, wherein the first user defined threshold and the second user defined threshold are non-zero values.

* * * * *